US012611878B2

(12) United States Patent
Shimizu et al.

(10) Patent No.: US 12,611,878 B2
(45) Date of Patent: Apr. 28, 2026

(54) PRINTING SYSTEM

(71) Applicant: SCREEN Holdings Co., Ltd., Kyoto (JP)

(72) Inventors: Junichi Shimizu, Kyoto (JP); Yuki Tsutsui, Kyoto (JP); Hiroaki Kagomi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 150 days.

(21) Appl. No.: 18/834,556

(22) PCT Filed: Nov. 28, 2022

(86) PCT No.: PCT/JP2022/043745
§ 371 (c)(1),
(2) Date: Jul. 30, 2024

(87) PCT Pub. No.: WO2023/149064
PCT Pub. Date: Aug. 10, 2023

(65) Prior Publication Data

US 2025/0121619 A1 Apr. 17, 2025

(30) Foreign Application Priority Data

Feb. 3, 2022 (JP) ................................ 2022-015638

(51) Int. Cl.
*B41J 11/00* (2006.01)
*B41J 29/377* (2006.01)
(Continued)

(52) U.S. Cl.
CPC ......... *B41J 29/377* (2013.01); *B41J 11/0022* (2021.01); *G03G 21/206* (2013.01); *B41J 2/01* (2013.01); *F26B 21/00* (2013.01)

(58) Field of Classification Search
CPC ........ B41J 29/377; B41J 11/0022; B41J 2/01; G03G 21/206; F26B 21/00
See application file for complete search history.

(56) References Cited

U.S. PATENT DOCUMENTS

2009/0252525 A1* 10/2009 Kojima .............. G03G 15/6573 399/92
2014/0286671 A1* 9/2014 Kumazawa .......... G03G 21/206 399/92
2017/0173973 A1* 6/2017 Tsutsui ..................... B41J 29/38

FOREIGN PATENT DOCUMENTS

JP H07-276611 A 10/1995
JP H10143053 A * 5/1998 ......... G03G 15/2017
(Continued)

OTHER PUBLICATIONS

International Search Report received in PCT Application No. PCT/JP2022/043745, dated Feb. 14, 2023.

*Primary Examiner* — Yaovi M Ameh
(74) *Attorney, Agent, or Firm* — Rimon P.C.

(57) ABSTRACT

In a printing system disclosed in the present invention, part of warm air supplied from a supply port of a drying unit is supplied from an exhaust gas inlet through exhaust ducts to a sensible heat exchanger, and is ejected from an exhaust gas outlet of the heat exchanger. The air ejected from the exhaust gas outlet enters from an outside air inlet through a first outside air duct, and heat thereof is exchanged with heat of outdoor air ejected outdoors from an outside air outlet through a second outside air duct. Air subjected to heat exchange and cooling is supplied through exhaust ducts to a first air intake port and a second air intake port of the drying unit. Accordingly, part of the warm air supplied from the drying unit to web paper undergoes heat exchange and is
(Continued)

reused, achieving reduction in amount of indoor air taken into the drying unit. This results in reduced burden on an air conditioner system.

8 Claims, 5 Drawing Sheets

(51) Int. Cl.

| | |
|---|---|
| ***G03G 21/20*** | (2006.01) |
| *B41J 2/01* | (2006.01) |
| *F26B 21/00* | (2006.01) |

(56) References Cited

FOREIGN PATENT DOCUMENTS

| | | | | | |
|---|---|---|---|---|---|
| JP | 2014-061616 | A | | 4/2014 | |
| JP | 2015-066696 | A | | 4/2015 | |
| JP | 2019117273 | A | * | 7/2019 | ........... G03G 21/206 |
| JP | 2019-163870 | A | | 9/2019 | |
| JP | 2020-152036 | A | | 9/2020 | |

* cited by examiner

PRINTING SYSTEM

CROSS-REFERENCE TO RELATED APPLICATIONS

This application is the U.S. National Phase application under 35 U.S.C. § 371, of international Application No. PCT/JP2022/043745, filed on Nov. 28, 2022, which in turn claims the benefit of Japanese Application No. 2022-015638, filed on Feb. 3, 2022, the disclosures of which Applications are incorporated by reference herein.

TECHNICAL FIELD

This invention relates to a printing system for performing printing on a print medium, particularly relates to a technique in association with drying of the print medium.

BACKGROUND ART

Examples of devices of such a currently-used type include a printing apparatus having a printing unit, a drying unit, a casing, a sensible heat exchanger, and a cooler (see, for example, Patent Literature 1).

The printing unit performs printing by ejecting inks to web paper being transported. The drying unit dries the web paper on which the printing unit has performed printing. The casing includes the printing unit and the drying unit. The drying unit includes, for example, an infrared lamp, a reflector, and a control board. In the drying unit, infrared light is emitted to the web paper. Moreover, the drying unit takes air inside, where the printing apparatus is installed, heats the air with infrared light from the infrared lamp, and supplies the air as warm air to the web paper. Indoor air is taken from an exterior of the casing in the place where the printing apparatus is installed. The taken air is used for cooling the control board of the drying unit and also for cooling in order to suppress excessive temperature rise of the web paper and the like. Part of warm air taken in and ejected from the drying unit is cooled and dehumidified through a high-temperature portion of the sensible heat exchanger and the cooler, flows through a low-temperature portion of the sensible heat exchanger, and is supplied to the drying unit again. The rest of the warm air taken in and ejected from the drying unit is ejected outdoors.

In this printing apparatus, part of the warm air is dehumidified and is supplied to the web paper again from the drying unit. This achieves efficient drying of the web paper. Moreover, part of the warm air is subjected to heat exchange with the sensible heat exchanger, achieving reduction in heating amount.

PRIOR ART DOCUMENT

Patent Literature

[Patent Literature 1]
Japanese Unexamined Patent Publication No. 2020-152036A

SUMMARY OF INVENTION

Technical Problem

However, the example of the currently-used apparatus with such a construction has the following drawback.

That is, in the currently-used apparatus, when a heating amount in the drying unit is increased for high-speed printing, an amount of air necessary for cooling is also increased, leading to increased indoor air intake. Accordingly, there arises a problem to increase burden on an indoor air conditioning system in the place where the printing apparatus is installed.

The present invention has been made regarding the state of the art noted above, and its one object is to provide a printing apparatus that can reduce burden on the air conditioning system with reuse of exhaust gas.

Solution to Problem

The present invention is constituted as stated below to achieve the above object. That is, one aspect of the present invention in claim 1 discloses a printing system for performing printing on a print medium, including a printing unit configured to perform the printing on the print medium, a drying unit configured to dry the print medium on which the printing is performed by the printing unit, the drying unit provided with an air intake port for taking air, and a supply port for performing cooling with air taken from the air intake port and heating the air, taken from the air intake port, to supply the air as warm air to the print medium, a casing including therein the printing unit and the drying unit, a heat exchanger provided with an outside air inlet through which outdoor air enters, an outside air outlet through which air from the outside air inlet is ejected outdoors, an exhaust gas inlet through which part of the warm air from the supply port is taken as exhaust gas, and an exhaust gas outlet through which air is exhausted whose heat is exchanged between the exhaust gas taken from the exhaust gas inlet and the outside air taken from the outside air inlet, a first exhaust duct through which part of the warm air supplied from the supply port is supplied to the exhaust gas inlet, a second exhaust duct via which the exhaust gas outlet is in fluid communication with the air intake port, a first outside air duct via which the outside air inlet is in fluid communication with the outdoors, a second outside air duct via which the outside air outlet is in communication with the outdoors, and an exhaust pipe through which part of the warm air supplied from the supply port is ejected to an exterior of the casing.

[Effect] With the aspect according to claim 1 of the present invention, the drying unit performs cooling with air taken from the air intake port, and performs drying to the print medium on which the printing unit has performed printing by supplying warm air from the supply port. Part of the warm air taken from the air intake port of the drying unit and supplied from the supply port of the drying unit to the print medium is ejected to the exterior of the casing through the exhaust pipe. Part of the warm air supplied from the supply port of the drying unit is supplied from the exhaust gas inlet through the first exhaust duct to the heat exchanger, and is ejected from the exhaust gas outlet of the heat exchanger. Air ejected from the exhaust gas outlet enters from the outside air inlet through the first outside air duct, and heat thereof is exchanged with heat of outdoor air ejected outdoors from the outside air outlet through the second outside air duct. Air subjected to the heat exchange and cooling is supplied through the second exhaust duct to the air intake port of the drying unit. Accordingly, part of the warm air supplied from the drying unit to the print medium undergoes heat exchange and is reused, achieving reduction in amount of indoor air taken into the drying unit. This results in reduced burden on an air conditioner system.

Moreover, it is preferred in the aspect of the present invention that a gas-liquid separating unit is further included that is provided on the second exhaust duct and configured to collect a liquid component from the exhaust gas (claim 2).

When the printing unit performs printing on the print medium with inks, absolute humidity of the warm air supplied from the supply port increases due to the dried print medium in the drying unit. Accordingly, relative humidity of air supplied from the exhaust gas inlet and passing the heat exchanger is higher than relative humidity of indoor air. Then, the gas-liquid separating unit provided on the second exhaust duct lowers absolute humidity of air after heat exchange. Secondary, air from which volatile organic compounds (VOC) and the like are removed is supplied to the air intake port of the drying unit. Accordingly, even with reused air, lowered drying efficiency can be prevented, and lowered printing quality by the volatile organic compounds can be prevented.

Moreover, it is preferred in the aspect of the present invention that further included are an indoor air supplying pipe configured to supply indoor air to the air intake port, an outdoor temperature and humidity sensor configured to detect a temperature and humidity of air in the first outside air duct, an indoor temperature and humidity sensor configured to detect a temperature and humidity of air in the second exhaust duct, and a controller configured to increase a supply amount of air from the indoor air supplying pipe when comparison is made between an output of the outdoor temperature humidity sensor and an output of the indoor temperature and humidity sensor and the output of the indoor temperature and humidity sensor is low (claim 3).

When the output of the indoor temperature and humidity sensor is lower than the output of the outdoor temperature and humidity sensor, the controller increases a supply amount of air from the indoor air supplying pipe. If the outdoor temperature and humidity are high, indoor air from the indoor air supplying pipe is increased, so that cooling and drying are less affected by the outdoor weather.

Moreover, it is preferred in the aspect of the present invention that the drying unit includes a heating unit configured to heat air and a control board configured to control the heating unit, that the air intake port includes a first air intake port configured to mainly take air to the heating unit and a second air intake port configured to mainly take air to the control board, and that the indoor air supplying pipe is in fluid communication with the second air intake port (claim 4).

Excessive heating of the control board may adversely affect operation of the heating unit. Accordingly, the control board is cooled by taking air from the second air intake port. The air is not air after heat exchange but air supplied from the indoor air supplying pipe. This achieves efficient cooling of the control board with air at room temperature.

Moreover, it is preferred in the aspect of the present invention that the drying unit includes in a transportation direction of the print medium a first uppermost-stream dry module, a second next-downstream dry module, and a third downmost-stream dry module, that the first exhaust duct is in fluid communication with supply ports of the first dry module and the third dry module, that the exhaust pipe is in fluid communication with a supply port of the second dry module, and that the second exhaust duct in fluid communication with the third dry module includes a gas-liquid separating unit configured to collect a liquid component from the exhaust gas (claim 5).

Air from the supply ports of the first dry module and the third dry module passes the first exhaust duct to undergo heat exchange by the heat exchanger for reuse. Air from the supply port of the second dry module passes the exhaust pipe and ejected outdoors without being reused. Air from only two dry modules of the three dry modules are reused, achieving reduction in load on the heat exchanger and in size of the heat exchanger. The third dry module is for drying on the most downstream. Accordingly, air passing the second exhaust duct contains the largest amount of vapor from the print medium undergoing drying with warm air from the first dry module and the second dry module. Then, the second exhaust duct in fluid communication with the third dry module includes the gas-liquid separating unit for collecting the liquid component to lower the absolute humidity of air. This results in reduction of lowered dry efficiency while reusing air from the supply port of the third dry module.

Moreover, it is preferred in the aspect of the present invention that the second outside air duct includes a blower configured to take outdoor air through the heat exchanger and the first outside air duct (claim 6).

The outdoor air sometimes has high relative humidity. In this case, if the blower is located on a side adjacent to the first outside air duct, water may possibly condense on the blower. Consequently, the blower is located on a side adjacent to the second outside air duct after the heat exchange, whereby air whose temperature has risen is sucked to prevent adverse effect caused by the water condense.

Moreover, it is preferred in the aspect of the present invention that the heat exchanger is a sensible heat exchanger configured to perform heat exchange only (claim 7).

A total heat exchanger perform exchange between heat and humidity. Accordingly, if a material such as volatile organic compounds is contained in air taken from outdoors, the material is mixed with air ejected from the exhaust gas outlet after the heat exchange, leading to possibility of reduction in printing quality. Then, the sensible heat exchanger that performs only heat exchange is adopted as the heat exchanger, whereby such an inconvenience is avoided.

Moreover, it is preferred in the aspect of the present invention that the exhaust pipe is an outdoor exhaust pipe configured to guide and eject part of the warm air supplied from the supply port outdoors (claim 8).

Since part of the warm air is ejected outdoors through the outdoor exhaust pipe, increase in indoor temperature can be suppressed.

Advantageous Effects of Invention

With the printing apparatus according to the aspect of the present invention, the drying unit performs cooling with air taken from the air intake port, and performs drying to the print medium on which the printing unit has performed printing by supplying warm air from the supply port. Part of the warm air taken from the air intake port of the drying unit and supplied from the supply port of the drying unit to the print medium is ejected to the exterior of the casing through the exhaust pipe. Part of the warm air supplied from the supply port of the drying unit is supplied from the exhaust gas inlet through the first exhaust duct to the heat exchanger, and is ejected from the exhaust gas outlet of the heat exchanger. Air ejected from the exhaust gas outlet enters from the outside air inlet through the first outside air duct, and heat thereof is exchanged with heat of outdoor air ejected outdoors from the outside air outlet through the second outside air duct. Air subjected to the heat exchange and cooling is supplied through the second exhaust duct to the air intake port of the drying unit. Accordingly, part of the warm air supplied from the drying unit to the print medium undergoes heat exchange and is reused, achieving reduction in amount of indoor air taken into the drying unit. This results in reduced burden on an air conditioner system.

DESCRIPTION OF EMBODIMENTS

The following describes first and second embodiments of the present invention with reference to drawings.

First Embodiment

Figure 1:
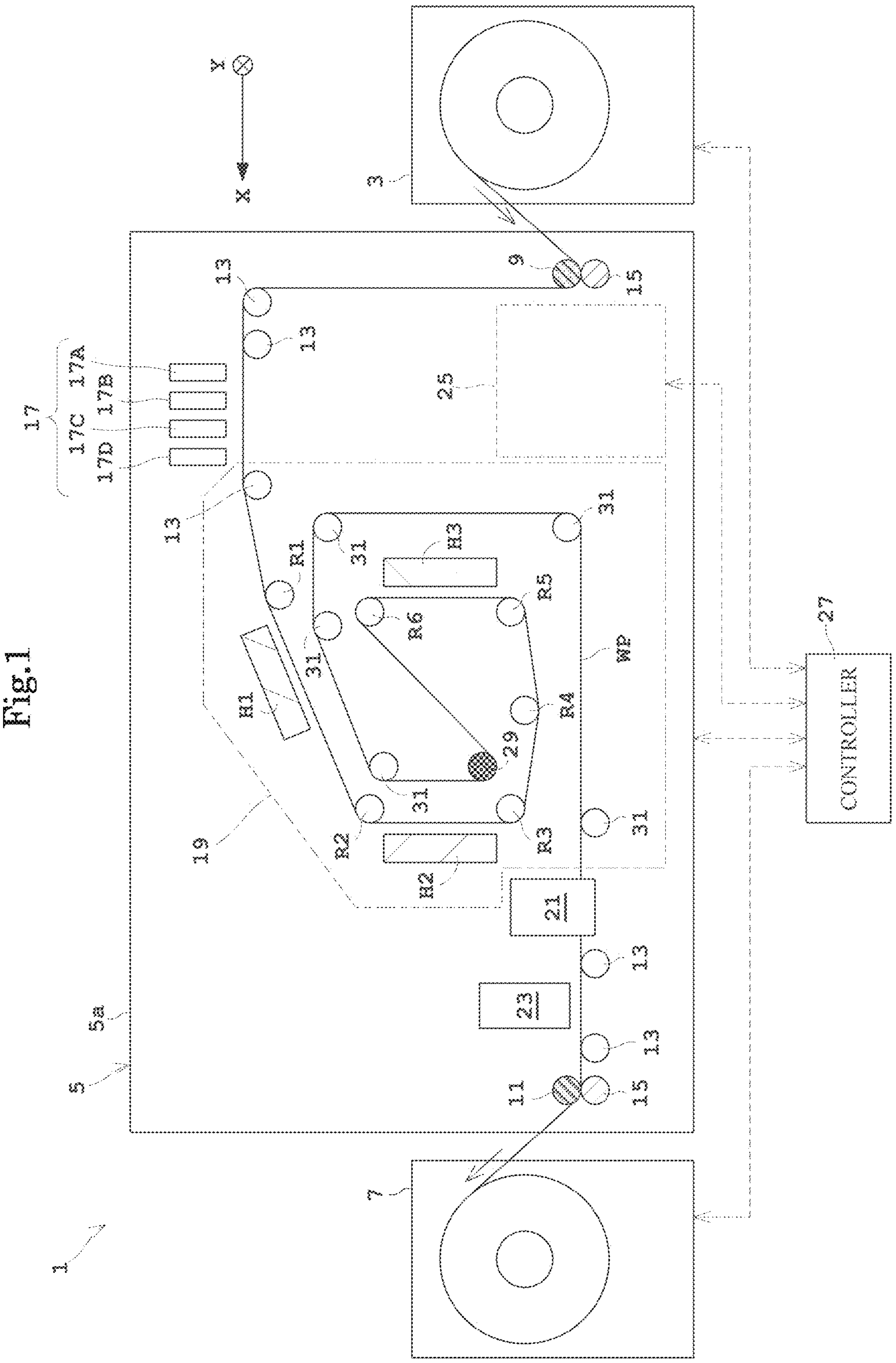
FIG. 1 is an overall diagram showing a schematic configuration of a printing system according to a first embodiment.

The following describes the first embodiment of the present invention with reference to the drawings. FIG. 1 is an overall diagram showing a schematic configuration of a printing system 1 according to the first embodiment.

1. Configuration of Printing System

The printing system 1 performs printing by ejecting inks. The printing system 1 includes a paper feeder 3, a printing apparatus 5, a take-up roller 7, and an annex unit 25.

The paper feeder 3 holds a roll of web paper (continuous paper) WP rotatably about a horizontal axis. The paper feeder 3 feeds the web paper WP from the roll of the web paper WP to the printing apparatus 5. The printing apparatus 5 performs printing on the elongated web paper WP. The take-up roller 7 winds up the web paper WP printed by printing apparatus body 5 around the horizontal axis. The take-up roller 7 includes an electric motor (not shown) configured to wind up the web paper WP. If it is assumed that the side from which the web paper WP is fed as upstream and the side to which the web paper WP is taken up as downstream, the paper feeder 3 is located upstream of the printing apparatus 5. Here, a direction from the side to be fed to the side to be taken up is referred to as a transportation direction X, whereas a direction horizontally orthogonal with respect to the transverse direction X is referred to as a transverse direction Y.

Here, the web paper WP described above corresponds to the "print medium" in the present invention.

The printing apparatus 5 includes two drive rollers 9 and 11, a plurality of transport rollers 13, and nip rollers 15. The drive roller 9 is located adjacent to an inlet of the printing apparatus body 5 immediately after the paper feeder 3. The drive roller 11 is located adjacent to an outlet of the printing apparatus body 5 immediately before the take-up roller 7. The drive rollers 9 and 11 are each supported rotatably around the transverse direction Y, and are each driven by an electric motor not shown. The drive roller 9 takes up the web paper WP from the paper feeder 3. The drive roller 11 feeds out the web paper WP to the take-up roller 7. The drive rollers 9 and 11 apply power for transportation to the web paper WP. The transport rollers 13 are supported rotatably, and guide the web paper WP. The transport rollers 13 include no electric motor like the drive roller 11, and apply no power for transportation to the web paper WP.

The printing apparatus 5 includes a casing 5*a*. The printing apparatus body 5 includes, inside of the casing 5*a*, a printing unit 17, a drying unit 19, a cooling unit 21, and an inspecting unit 23 in this order from upstream.

The printing unit 17 ejects inks to a printing face of the web paper WP to be transported. The printing unit 17 includes four printing heads 17A to 17D, for example. The four printing heads 17A to 17D eject ink by a piezoelectric element system or a thermal (bubble) system and the like, for example. The most upstream printing head 17A ejects a black (K) ink, for example. The next printing head 17B ejects a cyan (C) ink, for example. The next printing head 17C ejects a magenta (M) ink, for example. The next printing head 17D ejects a yellow (Y) ink, for example.

In this embodiment, the printing unit 17 includes the four printing heads 17A to 17D. However, the present invention is not limited to this configuration. For example, the printing unit 17 may include three or less, or five or more printing heads.

The drying unit 19 heats the web paper WP on which the printing unit 17 has performed printing to dry the inks. A detailed construction of the drying unit 19 is to be described later. The cooling unit 21 cools the web paper WP heated by the drying unit 19. The cooling unit 21 includes, for example, a water-cooled roller containing a flow path through which cooling water flows. The inspecting unit 23 includes a charge coupled device (CCD) sensor or a contact image sensor (CIS) and the like, for example. The inspecting unit 23 inspects figures printed on the web paper WP.

The printing system 1 includes the annex unit 25 in the vicinity of the printing apparatus 5 in plan view. The annex unit 25 is located externally and laterally in the transverse direction Y (back side on the plane of FIG. 1) of the casing 5*a* in the printing apparatus 5, for example. The annex unit 25 performs treatment concerning gas exhaust and gas supply of the drying unit 19 in the printing apparatus 5. Details of the annex unit 25 is to be described later.

The printing system 1 includes a controller 27. The controller 27 includes a CPU, a memory and the like, which illustration are omitted. The controller 27 controls the printing apparatus 5, the annex unit 25 and other components of the printing system 1. The controller 27 has a memory that stores programs necessary for operation of the printing system 1.

2. Construction of Drying Unit 19

The drying unit 19 includes six transport rollers R1 to R6, a printing face contact roller 29, and five transport rollers 31. The printing face of the web paper WP is a face to which the printing unit 17 causes inks to adhere. The rear face is a face opposite to the printing face and to which no inks adhere.

The rollers R1 to R6, the printing face contact roller 29, and the transport rollers 31 each have the same construction as those of the transport rollers 13 described above. Specifically, the rollers R1 to R6, the printing face contact roller 29, and the transport rollers 31 are each supported rotatably, and guide the web paper WP. The rollers R1 to R6, the printing face contact roller 29, and the transport rollers 31 include no electric motor like the drive roller 11 does, and apply no power for transportation to the web paper WP.

The six transport rollers R1 to R6 contact the rear face of the web paper WP to which the printing unit 17 perform printing to changes a transportation direction of the web paper WP. The printing face contact roller 29 is located downstream of the six transport rollers R1 to R6, and contacts the printing face of the web paper WP to change the transportation direction of the web paper WP. The web paper WP is transported by the six transport rollers R1 to R6 and the printing face contact rollers 29 in a swirling form.

The drying unit 19 includes, for example, three dry modules H1 to H3. The three dry modules H1 to H3 heat the web paper WP guided by the transport rollers 13, the transport rollers R1 to R6, and the printing face contact roller 31 on the downstream side of the printing unit 17. The first dry module H1, the second dry module H2, and the third dry module H3 are arranged in this order along the transportation path of the web paper WP. The three dry modules H1 to H3 heat the web paper WP in a non-contact manner.

The first dry module H1 faces the printing face of the web paper WP between the transport roller R1 on the downstream of the printing unit 17 and the transport roller R2. The second dry module H2 faces the printing face of the web paper WP between the two transport rollers R2 and R3 on the downstream of the first dry module H1. The third dry module H3 faces the printing face of the web paper WP between the two transport rollers R5 and R6.

Figure 2:
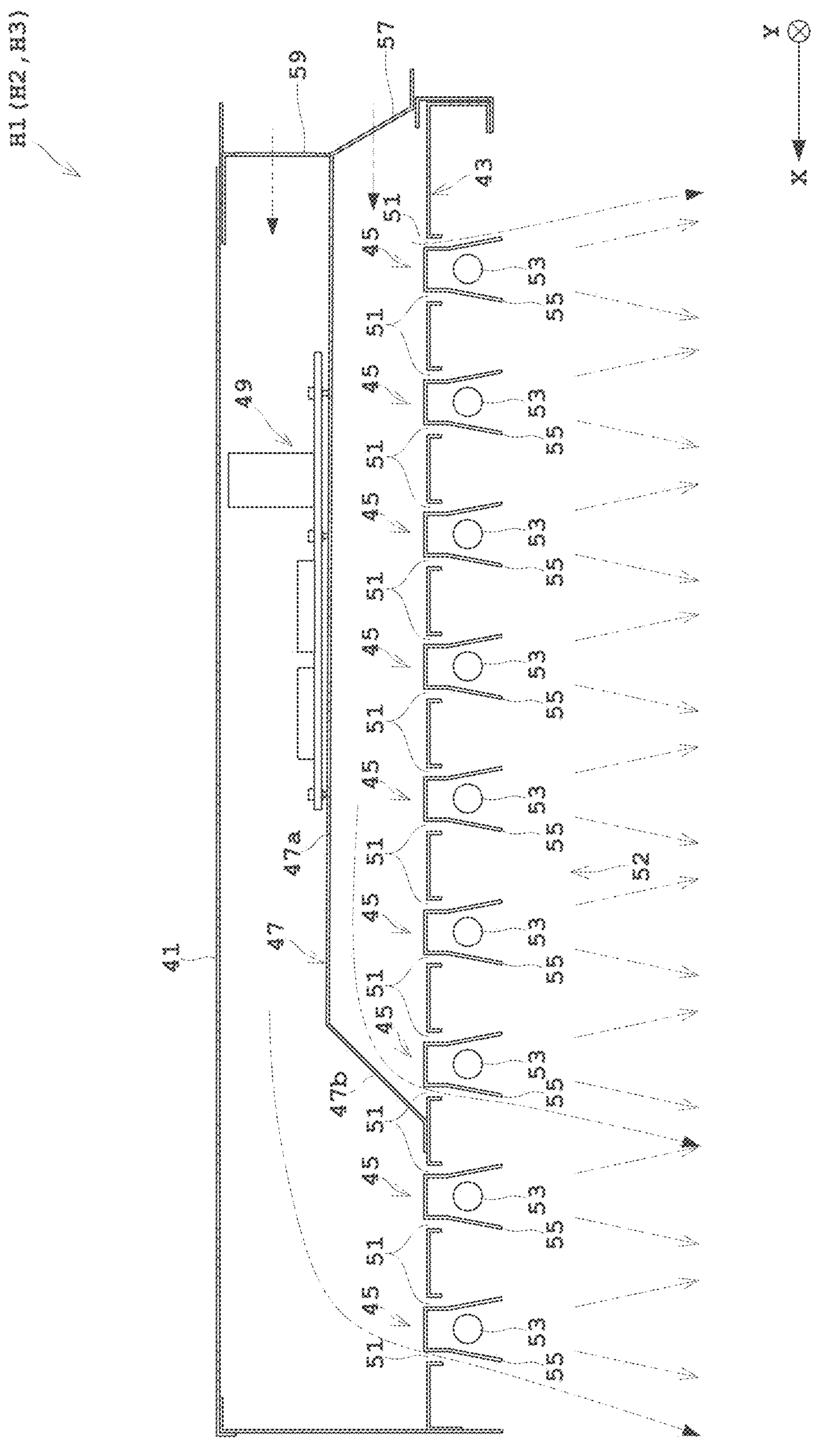
FIG. 2 is a longitudinal sectional view of a dry module.

Now, description is made of the first dry module H1 to the third dry module H3 with reference to FIG. 2. Here, FIG. 2 is a longitudinal sectional view of the dry module.

The first dry module H1 to the third dry module H3 all have the same construction. The following describes the first dry module H1 as one example.

The first dry module H1 includes a casing 41, a holding frame 43, lamp units 45, a straightening vane 47, and a control board 49.

The casing 41 has a hollow square column shape. The holding frame 43 is attached to a bottom face of the casing 41. The holding frame 43 has eight openings 51 formed therein. The eight opening 51 are separated from one another in the transportation direction X. The eight openings 51 are formed elongated in the transverse direction Y. The eight openings 51 entirely form one supply port 52.

Each of the openings 51 has a lamp unit 45 attached thereto. The lamp unit 45 includes a lamp 53 and a reflector 55. The lamp 53 is an infrared lamp that emits infrared light. The reflector 55 guides light emitted from the lamp 53 to an open end. The lamp unit 45 emits infrared light to the web paper WP to promote drying of the inks.

The casing 41 has a first air intake port 57 and a second air intake port 59 on a right side face thereof in FIG. 2. The casing 41 has the straightening vane 47 attached to the inside thereof. The straightening vane 47 has a horizontal portion 47*a* and a slope portion 47*b*. The horizontal portion 47*a* has one end connected to a boundary between the first air intake port 57 and the second air intake port 59. The horizontal portion 47*a* has the other end connected to one end of the slope portion 47*b*. The slope portion 47*b* has the other end connected to the holding frame 43. A portion where the other end of the slope portion 47*b* is connected to the holding frame 43 is between the two lamp units 45 on a side opposite to the first air intake port 57 and the second air intake port 59 and seven lamp units 45 on a side of the first air intake port 57 and the second air intake port 59. Air supplied from the first air intake port 57 is ejected from the supply port 52 while cooling the seven lamp units 45. At this time, a temperature of air supplied from the first air intake port 57 rises when cooling the seven lamp units 45, warm air is generated and is supplied from the supply port 52 to the web paper WP.

The control board 49 is attached to the horizontal portion 47*a* of the straightening vane 47. The control board 49 is attached to an upper face of the straightening vane 47. The control board 49 controls the nine lamp units 45. Specifically, supply power to each of the lamps 53 is adjusted in accordance with an instruction from the controller 27. The control board 49 controls relatively high power, and thus heat is generated along with operation thereof. If the temperature of the control board 49 excessively rises due to the generated heat, there may possibly arise a problem of the operation. The control board 49 is cooled with air supplied from the second air intake port 59. Air that cooled the control board 49 is ejected from the supply port 52 while cooling the two lamp units 45. At this time, a temperature of air supplied from the second air intake port 59 rises when cooling the two lamp units 45, warm air is generated and is supplied from the supply port 52 to the web paper WP.

With the construction as described above, the first dry module H1 to the third dry module H3 emit infrared light from the supply port 52 to the web paper WP. Moreover, the first dry module H1 to the third dry module H3 supply warm air from the supply port 52 to the web paper WP. Thereby, the first dry module H1 to the third dry module H3 dry the web paper WP.

Here, the lamp unit 45 described above corresponds to the "heating unit" in the present invention.

4. Construction of Annex Unit 25

Figure 3:
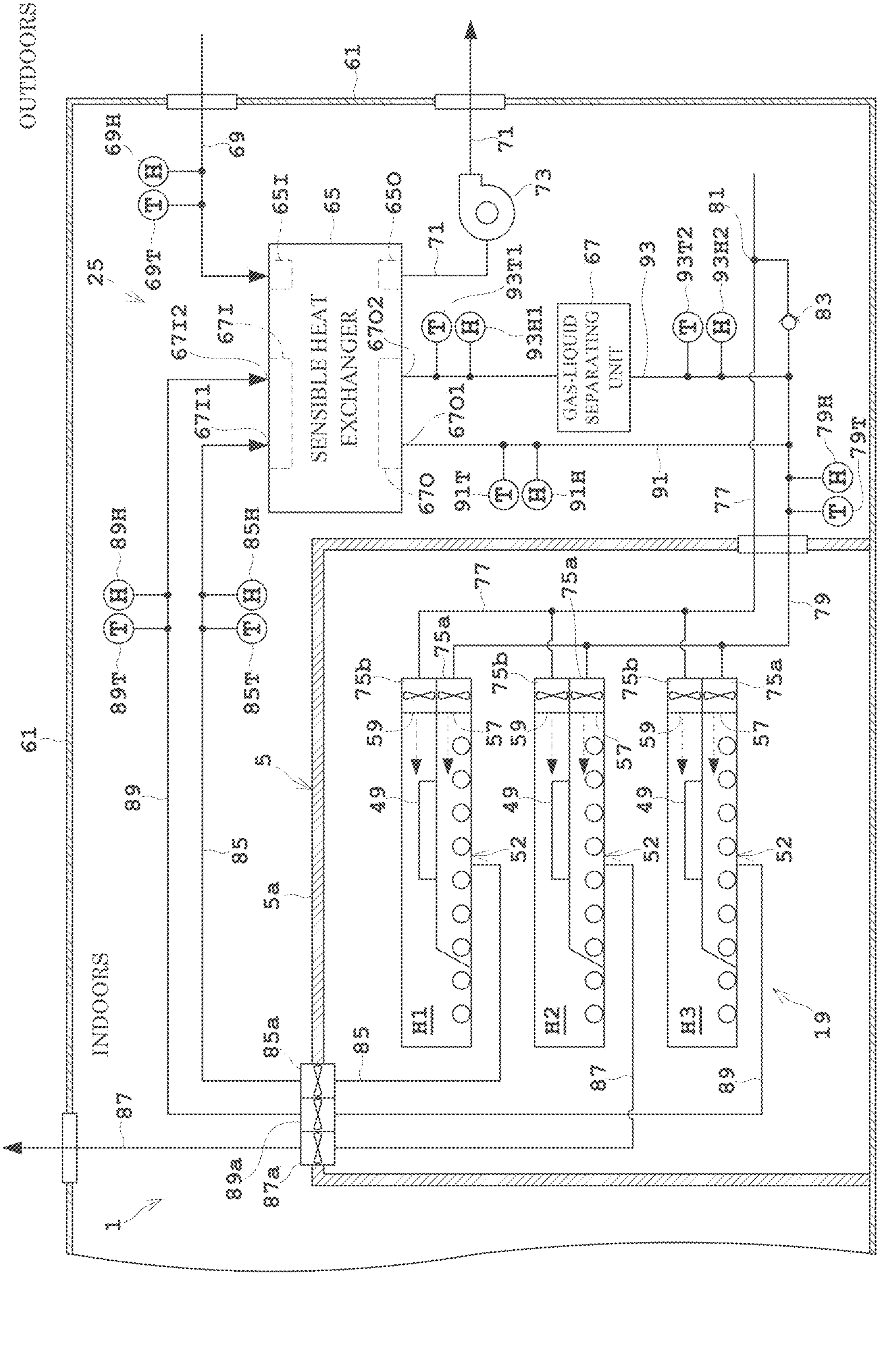
FIG. 3 illustrates indoor arrangement of the printing system.

Reference is now made to FIG. 3. Here, FIG. 3 illustrates indoor arrangement of the printing system 1. FIG. 3 omits illustration of constructions such as the paper feeder 3, the take-up roller 7, a transportation system, the web paper WP, and the like, which are less related to air flow.

The printing system 1 is installed indoors. The inside and outside of the place where the printing system 1 is installed are divided by a wall member 61.

The annex unit 25 includes a sensible heat exchanger 65, and a gas-liquid separating unit 67.

The sensible heat exchange 65 performs sensible heat exchange. The sensible heat exchange refers to exchange of only heat without exchange of latent heat (water vapor). The sensible heat exchanger 65 has a type such as a parallel flow type, a crossflow type, an opposed flow type, and the like. In the parallel flow type, directions of fluid are parallel. In the crossflow type, directions of fluid are orthogonal. In the opposed flow type, directions of fluid are opposite. In the present invention, the type of the sensible heat exchanger 65 is unconcerned.

Typically, heat and humidity are exchanged in the total heat exchanger. Accordingly, if a material such as volatile organic compounds is contained in air taken from outdoors, the material is mixed with air ejected after the heat exchange, leading to possibility of reduction in printing quality. Then, the sensible heat exchanger 65 that performs only heat exchange is adopted ad the heat exchanger, whereby such an inconvenience is avoided. However, the total heat exchanger may be used instead of the sensible heat exchanger 65 when there is no possibility of such reduction in printing quality.

The sensible heat exchanger 65 has an outside air inlet 65I, an outside air outlet 65O, an exhaust gas inlet 67I, and an exhaust gas outlet 67O, and performs sensible heat exchange between fluid such as air taken from the exhaust gas inlet 67I and air entering from the outside air inlet 65I. Air subjected to the sensible heat exchange is ejected from the exhaust gas outlet 67O. The fluid such as air entering from the outside air inlet 65I is ejected from the outside air outlet 65O after the sensible heat exchange. The exhaust gas inlet 67I has a first exhaust gas inlet 67I1 and a second exhaust gas inlet 67I2. The exhaust gas outlet 67O has a first exhaust gas outlet 67O1 and a second exhaust gas outlet 67O2.

The outside air inlet 65I is in fluid communication with one end of a first outside air duct 69. The other end of the first outside air duct 69 is in fluid communication with the outdoors as an exterior of the wall member 61 via a vent opening of the wall member 61. The first outside air duct 69 has a temperature sensor 69T and a humidity sensor 69H attached thereto. The temperature sensor 69T determines a temperature of fluid, such as air, flowing in the first outside air duct 69. The humidity sensor 69H determines humidity of fluid, such as air, flowing in the first outside air duct 69. The outside air outlet 65O is in fluid communication with one end of a second outside air duct 71. The other end of the second outside air duct 71 is in fluid communication with the outdoors as an exterior of the wall member 61 via a vent opening of the wall member 61. The second outside air duct 71 includes a blower 73. The blower 73 sucks fluid such as air. That is, the blower 73 takes outdoor air into the sensible heat exchanger 65 via the first outside air duct 69. The blower 73 ejects taken air outdoors via the second outside air duct 71. The blower 73 has an adjustable number of rotations. Thereby, an amount of outdoor air taken by the blower 73 is adjusted. The number of rotations of the blower 73 is controlled by the controller 27.

Here, the sensible heat exchanger 65 described above corresponds to the "heat exchanger" in the present invention. Moreover, the temperature sensor 69T and the humidity sensor 69H described above correspond to the "outdoor temperature and humidity sensor" in the present invention.

The blower 73 is provided on the second outside air duct 71 from the following reason. That is, the outdoor air sometimes has high relative humidity. In this case, if the blower 73 is located on a side adjacent to the first outside air duct 69, water may possibly condense on the blower 73. After the sensible heat exchange, air with higher temperature than that before undergoing sensible heat exchange flows on a side adjacent to the second outside air duct 71. Consequently, a relative humidity is lowered. Then, the blower 73 is located on this side, whereby adverse effect caused by the water condense can be prevented.

The first dry module H1 to the third dry module H3 each have a first fan 75*a* on the first air intake port 57. The first dry module H1 to the third dry module H3 each have a second fan 75*b* on the second air intake port 59. The first fan 75*a* and the second fan 75*b* feed fluid such as air to the inside of the first dry module H1 to the third dry module H3. The first fan 75*a* is in fluid communication with one end of a first air intake pipe 79. The other end of the first air intake pipe 79 is in fluid communication with the indoors as an exterior of the casing 5*a* and as an interior of the wall member 61. The second fan 75*b* is in fluid communication with one end of a second air intake pipe 77. The other end of the second air intake pipe 77 is in fluid communication with a branched part 81 of the first air intake pipe 79.

The first air intake pipe 79 has a temperature sensor 79T and a humidity sensor 79H attached thereto. The temperature sensor 79T determines a temperature of fluid, such as air, flowing in the first air intake pipe 79. The humidity sensor 79H determines humidity of fluid, such as air, flowing in the first air intake pipe 79. A check valve 83 is attached to the first air intake pipe 79. The check valve 83 avoids backflow of air from the gas-liquid separating unit 67 from the first air intake pipe 79 to the second air intake pipe 77 and the indoors.

The second air intake port 59 is in fluid communication with only the second air intake pipe 77. Excessive heating of the control board 49 may adversely affect operation of the lamp unit 45. Accordingly, the control board 49 is cooled by taking air from the second air intake port 59. The air is not air after the sensible heat exchange but air supplied from the second air intake pipe 77. Accordingly, the control board 49 can be cooled efficiently with air at room temperature. Moreover, the air floats outdoors. A material adversely affecting the control board 49 can be prevented from being mixed.

Here, the second air intake pipe 77 described above corresponds to the "indoor air supplying pipe" in the present invention.

One end of an exhaust duct 85 is opened in the vicinity of the supply port 52 of the first dry module H1. The other end of the exhaust duct 85 is in fluid communication with the first exhaust gas inlet 67I1 of the sensible heat exchanger 65. The exhaust duct 85 includes a fan 85*a*. The fan 85*a* draws air from the side adjacent to the supply port 52 as one end side of the exhaust duct 85 to the first exhaust gas inlet 67I1. Thereby, the exhaust duct 85 takes part of warm air supplied to the web paper WP from the supply port 52 of the first dry module H1. The exhaust duct 85 has a temperature sensor 85T and a humidity sensor 85H attached thereto. The temperature sensor 85T determines a temperature of fluid, such as air, flowing in the exhaust duct 85. The humidity sensor 85H determines humidity of fluid, such as air, flowing in the exhaust duct 85.

One end of an exhaust pipe 87 is opened in the vicinity of the supply port 52 of the second dry module H2. The other end of the exhaust pipe 87 is in fluid communication with the outdoors as an exterior of the wall member 61. The exhaust pipe 87 includes a fan 87*a*. The fan 87*a* ejects part of warm air supplied from the supply port 52 to the exterior of the casing 5*a*. More specifically, the fan 87*a* draws air outdoors from the side adjacent to the supply port 52 as one end side of the exhaust pipe 87.

Since the exhaust pipe 87 is in fluid communication with the outdoors, it ejects part of warm air from the second dry module H2 to the outdoors. This suppresses increase in indoor temperature of a place where the printing system 1 is installed. Note that the other end of the exhaust pipe 87 need not communicate with the outdoors. That is, it is only needed to communicate the casing 5*a* with the inside of the wall member 61 as the exterior of the casing 5*a* and to prevent increase in temperature within the casing 5*a*. Preferably, a vent opening is formed in the wall member 61 for natural ventilation to and from the outdoors.

Here, the exhaust pipe 87 described above corresponds to the "outdoor exhaust pipe" in the present invention.

One end of an exhaust duct 89 is opened in the vicinity of the supply port 52 of the third dry module H3. The other end of the exhaust duct 89 is in fluid communication with the second exhaust gas inlet 67I2 of the sensible heat exchanger 65. The exhaust duct 89 includes a fan 89*a*. The fan 89*a* draws air from the side adjacent to the supply port 52 as one end side of the exhaust duct 89 to the second exhaust gas inlet 67I2. Thereby, the exhaust duct 89 takes part of warm air supplied to the web paper WP from the supply port 52 of the second dry module H3. The exhaust duct 89 has a temperature sensor 89T and a humidity sensor 89H attached thereto.

One end of an exhaust duct 91 is in fluid communication with the first exhaust gas outlet 67O1 of the sensible heat exchanger 65. The other end of the exhaust duct 91 is in fluid communication with the first air intake pipe 79. Specifically, the fluid communication is made between the temperature sensor 79T and the humidity sensor 79H of the first air intake pipe 79 and the branched part 81. The exhaust duct 91 has a temperature sensor 91T and a humidity sensor 91H attached thereto.

Here, the temperature sensor 79T and the humidity sensor 79H described above correspond to the "indoor temperature and humidity sensor" in the present invention.

One end of an exhaust duct 93 is in fluid communication with the second exhaust gas outlet 67O2 of the sensible heat exchanger 65. The other end of the exhaust duct 93 is in fluid communication with the first air intake pipe 79. Specifically, the fluid communication is made between a connection point of the first air intake pipe 79 with the exhaust duct 91 and the check valve 83. The exhaust duct 93 includes a gas-liquid separating unit 67. The gas-liquid separating unit 67 separates and removes a liquid component from air flowing in the exhaust duct 93. The exhaust duct 93 has a temperature sensor 93T1, a humidity sensor 93H1, a temperature sensor 93T2, and a humidity sensor 93H2 attached thereto. The temperature sensor 93T1 and the humidity sensor 93H1 are attached to a portion of the exhaust duct 93 closer to the sensible heat exchanger 65 than the gas-liquid separating unit 67. The temperature sensor 93T2 and the humidity sensor 93H2 are attached to a portion of the exhaust duct 93 closer to the first air intake pipe 79 than the gas-liquid separating unit 67.

Part of air from the supply ports 52 of the first dry module H1 and the third dry module H3 passes the exhaust ducts 85, 89 to undergo heat exchange by the sensible heat exchanger 65 for reuse. Part of air from the supply port 52 of the second dry module H2 passes the exhaust pipe 87 and ejected outdoors without being reused. Part of air only from two dry modules H1 and H3 of the three dry modules H1 to H3 is reused. Consequently, reduction in load on the sensible heat exchanger 65 and in size of the sensible heat exchanger 65 can be achieved.

As is apparent from FIG. 1, the third dry module H3 is for drying on the most downstream in the transportation direction in the drying unit 19. Accordingly, air around the third dry module H3 contains a large volume of moisture from the web paper WP undergoing drying with warm air from the first dry module H1 and the second dry module H2. Then, the exhaust duct 89 where air from the third dry module H3 flows includes the gas-liquid separating unit 67 for collecting the liquid component to lower the humidity of air. This results in reduction of lowered dry efficiency while reusing air from the supply port 52 of the third dry module H3.

Here, the exhaust ducts 85, 89 described above correspond to the "first exhaust duct" in the present invention. Here, the exhaust ducts 91, 93 described above correspond to the "second exhaust duct" in the present invention.

The temperature sensor 69T, the humidity sensor 69H, the temperature sensor 79T, the humidity sensor 79H, the temperature sensor 85T, the humidity sensor 85H, the temperature sensor 89T, the humidity sensor 89H, the temperature sensor 91T, the humidity sensor 91H, the temperature sensor 93T1, the humidity sensor 93H1, the temperature sensor 93T2, and the humidity sensor 93H2 described above each output a detection value to the controller 27. Moreover, the first fan 75*a*, the second fan 75*b*, the fan 85*a*, the fan 87*a*, and the fan 89*a* described above each have a number of rotations controlled by the controller 27.

In particular, when comparison is made between outputs of the temperature sensor 69T and the humidity sensor 69H and outputs of the temperature sensor 79T and the humidity sensor 79H, and the outputs of the temperature sensor 79T and the humidity sensor 79H are lower than the outputs of the temperature sensor 69T and the humidity sensor 69H, the controller 27 preferably increases numbers of rotations of the first fan 75*a* and the second fan 75*b*. Thereby, if the outdoor temperature and humidity are high, indoor air from the first air intake pipe 79 and the second air intake pipe 77 is increased, so that cooling and drying are less affected by the outdoor weather. Moreover, a number of rotations of the blower 73 preferably increases when the outputs of the temperature sensor 79T and the humidity sensor 79H are higher than expected. This makes it possible to lower a temperature of air flowing in the first air intake pipe 79.

5. Operational Example

Figure 4:
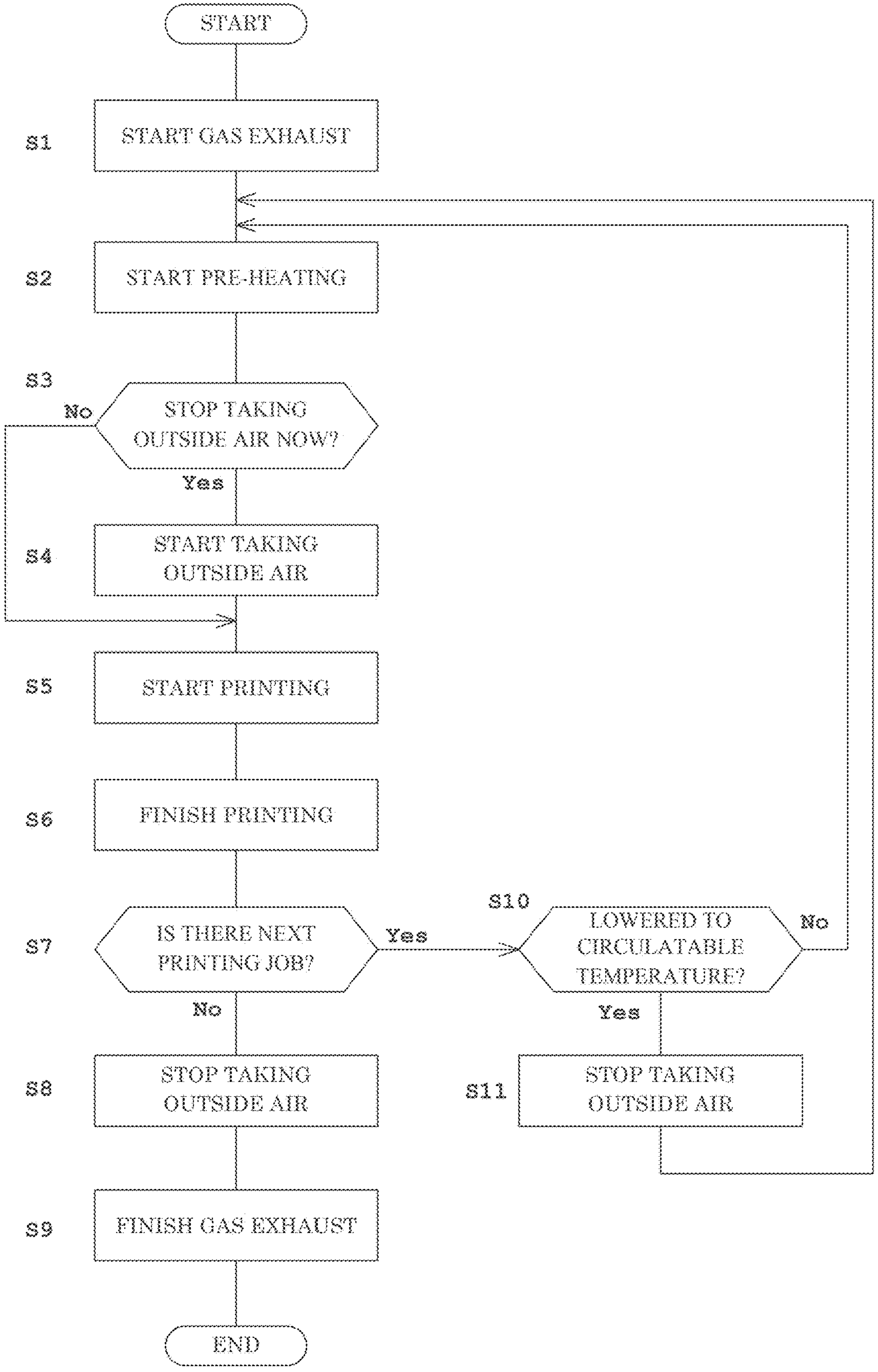
FIG. 4 is a flowchart showing an operational example.

The following describes operation of the printing system 1 described above with reference to FIG. 4. Now, FIG. 4 is a flowchart showing an operational example. It is assumed that the blower 73 stops in its initial state. That is, it is assumed that outdoor air is not drawn into the sensible heat exchanger 65.

Step S1

When the printing system 1 actuates, gas exhaust starts. Specifically, the controller 27 operates the first fan 75*a* and the second fan 75*b*, and also operates the fans 85*a*, 87*a*, and 89*a*. Thereby, air around the supply port 52 of the second dry module H2 is ejected outdoors from the exhaust pipe 87. Air around the supply ports 52 of the first dry module H1 and the third dry module H3 passes the exhaust ducts 85, 89 to circulate simply. Moreover, indoor air is supplied to the first dry module H1 to the third dry module H3 via the first air intake pipe 79 and the second air intake pipe 77.

Step S2

Pre-heating starts before performing printing. Specifically, the controller 27 operates the first dry printing H1 to the third dry module H3 in accordance with a printing condition. That is, an instruction is given to the control board 49 to emit infrared light from the lamp unit 45 so as to obtain a drying temperature corresponding to the printing condition. Moreover, pre-heating starts and numbers of rotations of the first fan 75*a* and the second fan 75*b* increase, as necessary.

Step S3

The controller 27 branches the processing in accordance with a state where outside air is taken. Specifically, the controller 27 branches the processing in accordance with the operation status of the blower 73. It is determined that no outside air is taken if the blower 73 stops, whereas it is determined that outside air is now taken if the blower 73 is under operation. Since the blower 73 stops at this time, the procedure is shifted to a step S4.

Step S4

The controller 27 operates the blower 73 to supply outdoor air from the first outside air duct 69 and the outside air inlet 65I to the sensible heat exchanger 65, and ejects air subjected to sensible heat exchange outdoors from the second outside air duct 71 and the outside air outlet 65O.

Step S5

The controller 27 operates the paper feeder 3, the printing apparatus 5, and the take-up roller 7 to start printing on the web paper WP. At this time, part of warm air supplied from the supply port 52 of the second dry module H2 to the web paper WP is ejected outdoors from the exhaust pipe 87. Part of warm air supplied from the supply port 52 of the first dry module H1 to the web paper WP is sent to the sensible heat exchanger 65 via the exhaust duct 85. Here, the warm air is subjected to sensible heat exchange with outside air, and is cooled and supplied to the first air intake ports 57 of the first dry module H1 to the third dry module H3 again via the exhaust duct 91 and the first air intake pipe 79. Part of warm air supplied from the supply port 52 of the third dry module H3 to the web paper WP is sent to the sensible heat exchanger 65 via the exhaust duct 89. Here, the warm air is subjected to sensible heat exchange with outside air, and the cooled air after the sensible heat exchange is supplied to the exhaust duct 93. Gas-liquid separation is performed by the gas-liquid separating unit 67 in the exhaust duct 93. Thereby, a component of the inks contained in the air (e.g., volatile organic compounds (VOC)) is removed. The air subjected to cooling and gas-liquid separation and the gas-liquid separation is sent to the first air intake pipe 79 via the exhaust duct 93, and is supplied to the first air intake ports 57 of the first dry module H1 to the third dry module H3 again.

Here, part of indoor air is also taken into the first air intake pipe 79 from the branched part 81 of the second air intake pipe 77. That is, indoor air is mixed and supplied to the first air intake ports 57 of the first dry module H1 to the third dry module H3 in addition to the air subjected to the sensible heat exchange as part of the warm air supplied to the supply ports 52 of the first dry module H1 and the third dry module H3.

Step S6

The controller 27 finishes the printing on the web paper WP. On the other hand, part of the warm air is kept under exhaust or circulation.

Step S7

The controller 27 branches the processing in accordance with whether or not there is next printing job.

Step S8

If there is no printing job, the controller 27 stops intake of the outside air. Specifically, the controller 27 stops the blower 73.

Step S9

The controller 27 stops exhaust. Specifically, the controller 27 stops the first fan 75*a*, the second fan 75*b*, and the fans 85*a*, 87*a*, and 89*a*.

Now, description is made of a case where there is next printing job in the above-mentioned step S7.

Step S10

The controller 27 branches the processing in accordance with whether or not the temperature of air is lowered to a circulatable temperature. Now, the circulatable temperature is a temperature necessary for cooling the first dry module H1 to the third dry module H3. Specifically, the controller 27 determines the temperature from the temperature of air flowing the exhaust duct 85 and the exhaust duct 89 that circulate air. More specifically, the controller 27 determines whether or not the temperature is the circulatable temperature from the temperature outputted from the temperature sensors 85T, 89T. If the temperature is not equal to or less than the circulatable temperature, outside air is continuously taken and the procedure returns to the step S2.

Step S11

If the temperature is equal to or less than the circulatable temperature, the controller 27 stops the blower 73. Thereby, air circulates simply via the exhaust ducts 85, 89, 91, 93 without undergoing sensible heat exchange by the sensible heat exchanger 65.

According to this embodiment, the drying unit 19 performs cooling with air taken from the first air intake port 57 and the second air intake port 59, and performs drying to the web paper WP on which the printing unit 17 has performed printing by supplying warm air from the supply port 52. Part of the warm air taken from the first air intake port 57 and the second air intake port 59 of the drying unit 19 and supplied from the supply port 52 of the drying unit 19 to the web paper WP is ejected to the exterior of the casing 5*a* through the exhaust pipes 85, 89. Part of the warm air supplied from the supply port 52 of the drying unit 19 is supplied from the exhaust gas inlet 67I through the exhaust ducts 85, 89 to the sensible heat exchanger 65, and is ejected from the exhaust gas outlet 67O of the heat exchanger 65. The air ejected from the exhaust gas outlet 67O enters from the outside air inlet 65I through the first outside air duct 69, and heat thereof is exchanged with heat of outdoor air ejected outdoors from the outside air outlet 65O through the second outside air duct 71. Air subjected to heat exchange and cooling is supplied through the exhaust ducts 91, 93 to the first air intake port 57 and the second air intake port 59 of the drying unit 19. Accordingly, part of the warm air supplied from the drying unit 19 to the web paper WP undergoes heat exchange and is reused, achieving reduction in amount of indoor air taken into the drying unit 19. This results in reduced burden on an air conditioner system that takes outside air inside of the wall member 61.

Moreover, since the web paper WP contains the inks, absolute humidity of the warm air supplied from the supply port 52 of the drying unit 19 increases. Since the annex unit 25 includes the gas-liquid separating unit 67, the absolute humidity can be reduced and the volatile organic compounds and the like can be removed. Accordingly, even with reused air, lowered drying efficiency can be prevented, and lowered printing quality by the volatile organic compounds can be prevented.

Here, a specific example of the temperature and humidity in every element is cited for reference:

- Temperature sensor 69T and humidity sensor 69H of first outside air duct 69: 25° C., 40%
- Temperature and humidity of air ejected outdoors from second outside air duct 71: 45° C., 15%
- Temperature sensor 85T and humidity sensor 85H of exhaust duct 85: 80° C., 4%
- Temperature and humidity of air ejected outdoors from exhaust pipe 87: 80° C., 5%
- Temperature sensor 89T and humidity sensor 89H of exhaust duct 89: 80° C., 9%
- Temperature sensor 91T and humidity sensor 91H of exhaust duct 91: 38° C., 29%
- Temperature sensor 93T1 and humidity sensor 93H1 of exhaust duct 93: 38° C., 66%
- Temperature sensor 93T2 and humidity sensor 93H2 of exhaust duct 93: 20° C., 100%
- Temperature sensor 79T of first air intake pipe 79: 35° C.

As described above, the temperature of reused air is lowered to 35° C. Accordingly, the reuse can achieve sufficient cooling.

Second Embodiment

The following describes a second embodiment of the present invention with reference to the drawings.

Figure 5:
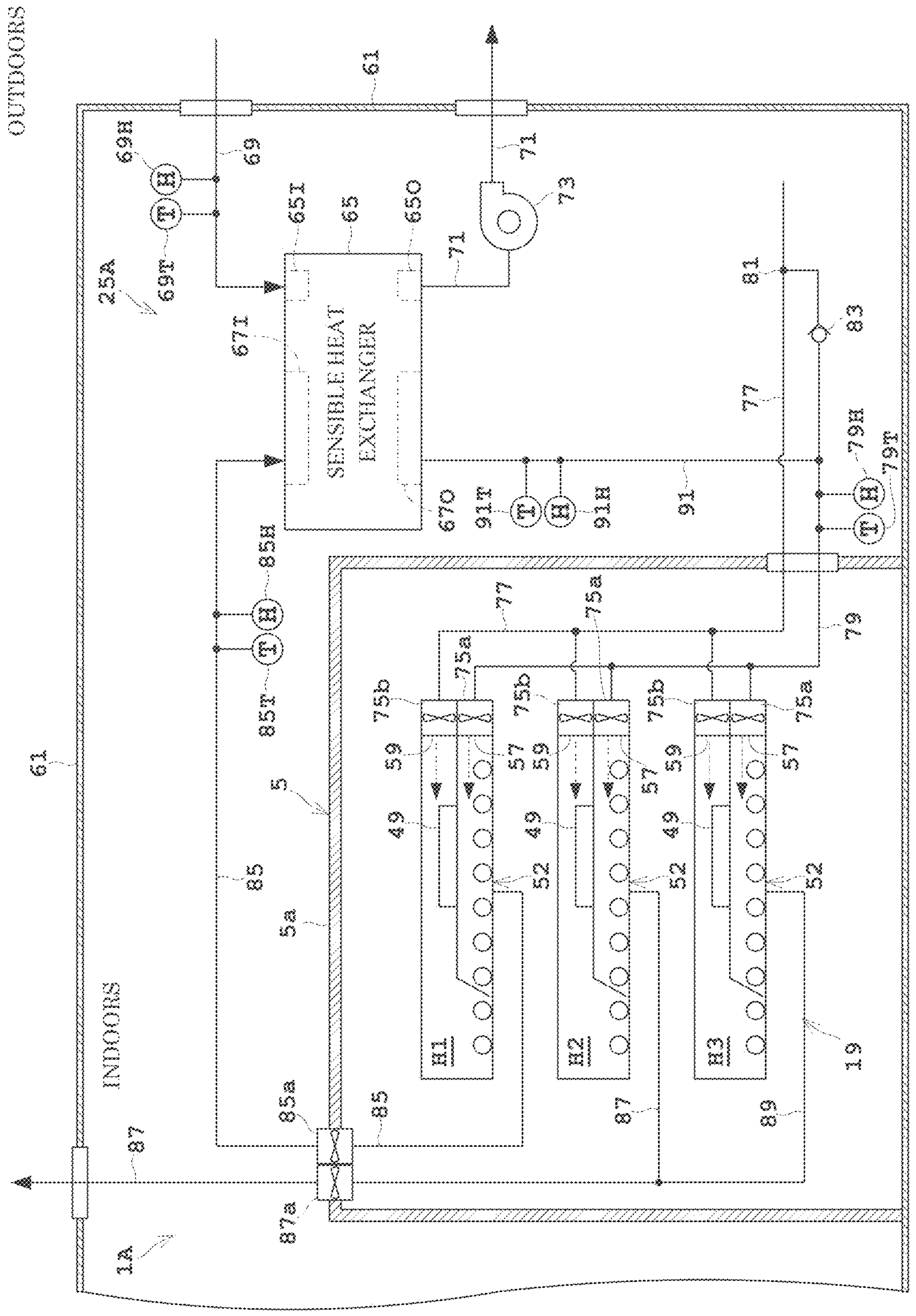
FIG. 5 illustrates indoor arrangement of a printing system according to a second embodiment.

FIG. 5 illustrates indoor arrangement of a printing system according to a second embodiment. Note that a construction of a printing system 1A is same as the construction of the printing system 1 in the above-described embodiment 1 except for the construction of the exhaust and circulation systems. Therefore, detailed description is to be omitted.

In the second embodiment, part of warm air from supply ports 52 of a second dry module H2 and a third dry module H3 is ejected outdoors. Only part of warm air from the supply ports 52 of the first dry module H1 is reused.

Specifically, one end of an exhaust pipe 87 is opened in the vicinity of the supply port 52 of the second dry module H2. The other end of the exhaust pipe 87 is in fluid communication with the outdoors. The exhaust pipe 87 includes a fan 87*a*. The fan 87*a* draws air outdoors from the side adjacent to the supply port 52 as one end side of the exhaust pipe 87. One end of an exhaust pipe 89 is opened in the vicinity of the supply port 52 of the third dry module H3. The other end of the exhaust pipe 89 is in fluid communication with the exhaust pipe 87. Accordingly, part of the warm air from the supply ports 52 of the second dry module H2 and the third dry module H3 is ejected outdoors.

One end of an exhaust duct 85 is opened in the vicinity of the supply port 52 of the first dry module H1. The other end of the exhaust duct 85 is in fluid communication with an exhaust gas inlet 67I of a sensible heat exchanger 65. The exhaust duct 85 includes a fan 85*a*. The fan 85*a* draws air from the side adjacent to the supply port 52 as one end side of the exhaust duct 85 to the exhaust gas inlet 67I. Thereby, the exhaust duct 85 takes part of warm air supplied to the web paper WP from the supply port 52 of the first dry module H1. The exhaust duct 85 has a temperature sensor 85T and a humidity sensor 85H attached thereto.

An annex module 25A does not include the gas-liquid separating unit 67, which differs from the first embodiment described above. One end of an exhaust duct 91 is in fluid communication with an exhaust gas outlet 67O of the sensible heat exchanger 65. The other end of the exhaust duct 91 is in fluid communication with the first air intake pipe 79. The exhaust duct 91 has a temperature sensor 91T and a humidity sensor 91H attached thereto.

A part of the sensible heat exchanger 65 on an outside air side has the same construction as that in the first embodiment described above. Moreover, a gas supplying system to the first air intake port 57 and the second air intake port 59 of the first dry module H1 to the third dry module H3 is similar to that in the first embodiment described above.

This embodiment can produce the same effect with a simpler construction than the first embodiment. Moreover, the exhaust duct 89 where air containing the largest volume of moisture flows is in fluid communication with the outdoors via the exhaust pipe 87. Consequently, there needs no gas-liquid separating unit 67 and only air flowing in the exhaust duct 85 is to undergo heat exchange, achieving reduction in load or size of the sensible heat exchanger 65.

Here, a specific example of the temperature and humidity in every element is cited for reference:

Temperature sensor 69T and humidity sensor 69H of first outside air duct 69: 25° C., 40%

Temperature and humidity of air ejected outdoors from second outside air duct 71: 47° C., 12%

Temperature sensor 85T and humidity sensor 85H of exhaust duct 85: 80° C., 4%

Temperature and humidity of air ejected outdoors from exhaust pipe 87: 80° C., 7% (not actual measurement but predicted value)

Temperature sensor 91T and humidity sensor 91H of exhaust duct 91: 35° C., 33%

Temperature sensor 79T of first air intake pipe 79: 35° C.

As described above, the temperature of reused air is lowered to 35° C. also with the second embodiment. Accordingly, the reuse can achieve sufficient cooling.

The present invention is not limited to the foregoing examples, but may be modified as follows.

(1) In the first and second embodiments described above, the drying unit 19 includes the three dry modules H1 to H3. However, the present invention is not limited to this construction. For example, the drying unit 19 may include only one dry module H1. Alternatively, the drying unit 19 may include four or more dry modules.

(2) In the first and second embodiments described above, the temperature and humidity sensor such as the temperature sensor 69T and the humidity sensor 69H and the like is provided. However, such a temperature and humidity sensor is not essential in the present invention. Regardless of the temperature and humidity, the controller 27 may be configured such that part of warm air from the supply port 52 circulates while undergoing heat exchange for reuse.

(3) In the first and second embodiments described above, the drying unit 19 changes a supply source of air between the first air intake port 57 and the second air intake port 59. However, such a configuration is not essential in the present invention. Moreover, the dry module may have one air intake port in the drying unit 19.

(4) In first and second embodiments described above, the dry modules H1 to H3 include the lamp units 45. However, the lamp unit 45 is not essential to the present invention. For example, such a construction is adoptable that includes an electric heater instead of the lamp unit 45.

(5) In the first and second embodiments described above, the web paper WP has been described as one example of the print medium. However, the print medium is not limited to the web paper WP in the present invention. Examples of the print medium include a plastic film and cut paper.

INDUSTRIAL APPLICABILITY

As described above, the present invention is suitable for the printing system including the printing apparatus configured to perform printing by ejecting inks.

REFERENCE SIGNS LIST

1 . . . printing system
3 . . . paper feeder
5 . . . printing apparatus
5*a* . . . casing
7 . . . take-up roller
X . . . transportation direction
Y . . . transverse direction
17 . . . printing unit
19 . . . drying unit
25 . . . annex unit
H1 to H3 . . . first dry module to third dry module
45 . . . lamp unit
47 . . . straightening vane
49 . . . control board
57 . . . first air intake port
59 . . . second air intake port
61 . . . wall member
65 . . . sensible heat exchanger
67 . . . gas-liquid separating unit
65I . . . outside air inlet
65O . . . outside air outlet
67I . . . exhaust gas inlet
67I1 . . . first exhaust gas inlet
67I2 . . . second exhaust gas inlet
67O . . . exhaust gas outlet
67O1 . . . first exhaust gas outlet

67O2 . . . second exhaust gas outlet
69 . . . first outside air duct
69T, 79T, 85T, 89T, 91T, 93T1, 93T2 . . . temperature sensor
69H, 79H, 85H, 89H, 91H, 93H1, 93H2 . . . humidity sensor
71 . . . second outside air duct
73 . . . blower
75*a* . . . first fan
75*b* . . . second fan
77 . . . second air intake pipe
79 . . . first air intake pipe
85, 89, 91, 93 . . . exhaust duct
87 . . . exhaust pipe

The invention claimed is:

1. A printing system for performing printing on a print medium, comprising:

a printing unit configured to perform the printing on the print medium;

a drying unit configured to dry the print medium on which the printing is performed by the printing unit, the drying unit provided with an air intake port for taking air, and a supply port for performing cooling with air taken from the air intake port and heating the air, taken from the air intake port, to supply the air as warm air to the print medium;

a casing including therein the printing unit and the drying unit;

a heat exchanger provided with an outside air inlet through which outdoor air enters, an outside air outlet through which air from the outside air inlet is ejected outdoors, an exhaust gas inlet through which part of the warm air from the supply port is taken as exhaust gas, and an exhaust gas outlet through which air is exhausted whose heat is exchanged between the exhaust gas taken from the exhaust gas inlet and the outside air taken from the outside air inlet;

a first exhaust duct through which part of the warm air supplied from the supply port is supplied to the exhaust gas inlet;

a second exhaust duct via which the exhaust gas outlet is in fluid communication with the air intake port;

a first outside air duct via which the outside air inlet is in fluid communication with the outdoors;

a second outside air duct via which the outside air outlet is in communication with the outdoors; and an exhaust pipe through which part of the warm air supplied from the supply port is ejected to an exterior of the casing.

2. The printing system according to claim 1, further comprising:

a gas-liquid separating unit provided on the second exhaust duct and configured to collect a liquid component from the exhaust gas.

3. The printing system according to claim 1, further comprising:

an indoor air supplying pipe configured to supply indoor air to the air intake port;

an outdoor temperature and humidity sensor configured to detect a temperature and humidity of air in the first outside air duct;

an indoor temperature and humidity sensor configured to detect a temperature and humidity of air in the second exhaust duct; and a controller configured to increase a supply amount of air from the indoor air supplying pipe when comparison is made between an output of the outdoor temperature humidity sensor and an output of the indoor temperature and humidity sensor and the output of the indoor temperature and humidity sensor is low.

4. The printing system according to claim 3, wherein the drying unit includes a heating unit configured to heat air and a control board configured to control the heating unit, the air intake port includes a first air intake port configured to mainly take air to the heating unit and a second air intake port configured to mainly take air to the control board, and the indoor air supplying pipe is in fluid communication with the second air intake port.

5. The printing system according to claim 1, wherein the drying unit includes in a transportation direction of the print medium a first uppermost-stream dry module, a second next-downstream dry module, and a third downmost-stream dry module, the first exhaust duct is in fluid communication with supply ports of the first dry module and the third dry module, the exhaust pipe is in fluid communication with a supply port of the second dry module, and the second exhaust duct in fluid communication with the third dry module includes a gas-liquid separating unit configured to collect a liquid component from the exhaust gas.

6. The printing system according to claim 1, wherein the second outside air duct includes a blower configured to take outdoor air through the heat exchanger and the first outside air duct.

7. The printing system according to claim 1, wherein the heat exchanger is a sensible heat exchanger configured to perform heat exchange only.

8. The printing system according to claim 1, wherein the exhaust pipe is an outdoor exhaust pipe configured to guide and eject part of the warm air supplied from the supply port outdoors.

* * * * *